(12) United States Patent
Park et al.

(10) Patent No.: US 11,643,361 B2
(45) Date of Patent: May 9, 2023

(54) METHOD OF INCREASING STRENGTH OF GLASS SUBSTRATE FOR OPTICAL FILTER AND TEMPERED-GLASS OPTICAL FILTER MADE THEREBY

(71) Applicant: UTI INC., Chungcheongnam-do (KR)

(72) Inventors: Deok Young Park, Gyeonggi-do (KR);
Jae Young Hwang, Gyeonggi-do (KR);
Hak Chul Kim, Chungcheongnam-do (KR); Hack Seon Kim, Chungcheongnam-do (KR); Tea Joo Ha, Chungcheongnam-do (KR)

(73) Assignee: UTI INC.

( * ) Notice: Subject to any disclaimer, the term of this patent is extended or adjusted under 35 U.S.C. 154(b) by 159 days.

(21) Appl. No.: 16/726,499

(22) Filed: Dec. 24, 2019

(65) Prior Publication Data

US 2020/0207658 A1    Jul. 2, 2020

(30) Foreign Application Priority Data

Dec. 27, 2018  (KR) .................. 10-2018-0170281

(51) Int. Cl.
*C03C 21/00* (2006.01)
*G02B 5/28* (2006.01)
*C03C 17/34* (2006.01)

(52) U.S. Cl.
CPC ........ *C03C 21/002* (2013.01); *C03C 17/3417* (2013.01); *G02B 5/282* (2013.01); *C03C 2217/70* (2013.01)

(58) Field of Classification Search
None
See application file for complete search history.

(56) References Cited

U.S. PATENT DOCUMENTS

| | | | |
|---|---|---|---|
| 9,801,297 B2 * | 10/2017 | Amin | ................... B32B 17/1077 |
| 10,550,029 B2 * | 2/2020 | Gross | ..................... C03C 21/002 |
| 2012/0219792 A1 * | 8/2012 | Yamamoto | ............ C03C 21/005 65/30.14 |
| 2013/0169591 A1 * | 7/2013 | Hung | ....................... C03C 21/00 428/156 |
| 2014/0227525 A1 * | 8/2014 | Matsuda | .................. C03C 3/087 65/30.14 |
| 2015/0166404 A1 * | 6/2015 | Lee | ........................... C03C 8/24 501/15 |
| 2016/0318796 A1 * | 11/2016 | Masuda | ................... C03C 17/32 |
| 2017/0150628 A1 * | 5/2017 | Amin | ........................ B32B 7/12 |
| 2017/0183255 A1 * | 6/2017 | Walther | .................. C03C 3/091 |
| 2018/0052254 A1 * | 2/2018 | Takai | .................. C23C 14/3464 |
| 2018/0088399 A1 * | 3/2018 | Fukushi | .............. C03B 23/0357 |
| 2018/0186685 A1 * | 7/2018 | Murayama | .............. C03C 3/085 |
| 2018/0319696 A1 * | 11/2018 | Akiba | ..................... C03C 3/093 |
| 2019/0033144 A1 * | 1/2019 | Andrews | ................ G01N 21/23 |
| 2019/0094429 A1 * | 3/2019 | Park | ......................... G02B 1/14 |

(Continued)

*Primary Examiner* — Jodi C Franklin
(74) *Attorney, Agent, or Firm* — Mendelsohn Dunleavy, P.C.

(57) ABSTRACT

The present invention provides a method of increasing the strength of a glass substrate for optical filters and a tempered-glass optical filter using a tempered glass substrate manufactured using the same, in which the glass substrate for optical filters is subjected to chemical tempering so that a compressive stress (CS) and a depth of layer (DOL) of the glass substrate are adjusted to increase the bending strength thereof.

7 Claims, 4 Drawing Sheets

(56) References Cited

U.S. PATENT DOCUMENTS

| | | | |
|---|---|---|---|
| 2019/0179066 A1* | 6/2019 | Park | C03C 3/04 |
| 2019/0300426 A1* | 10/2019 | Fu | C03C 21/002 |
| 2019/0337845 A1* | 11/2019 | Hei-Chouquet | C03C 15/00 |
| 2020/0109088 A1* | 4/2020 | Lange | F23R 3/002 |
| 2020/0131080 A1* | 4/2020 | Yuan | C03C 10/0027 |
| 2020/0207658 A1* | 7/2020 | Park | G02B 5/282 |
| 2020/0346969 A1* | 11/2020 | Li | C03C 3/097 |
| 2020/0369560 A1* | 11/2020 | Takeda | C03C 3/085 |
| 2020/0389991 A1* | 12/2020 | Shannon | H04M 1/0264 |
| 2021/0024405 A1* | 1/2021 | Yu | C03C 10/0027 |
| 2021/0380474 A1* | 12/2021 | Brandenburg | B32B 17/10 |

\* cited by examiner

FIG. 3

| Evaluation Index | Example 1 | Example 2 |
|---|---|---|
| Number of specimens | 10 | 20 |
| Tempering concept | High CS | High CS |
| Compressive stress(MPa) | 800 | 1000 |
| Depth of layer(um) | 20 | 22 |
| Tempering temperature(°C) | 400 | 440 |
| Tempering time (minute) | 60 | 60 |
| Deposition coating layer | AR 0.4μm, IR 4.0μm | AR 0.4μm, IR 4.0μm |
| Bending strength(3PB B10; MPa) | 510 | 720 |

FIG. 4

| Compressive stress(MPa) | Depth of layer(μm) | Compressive stress x Depth of layer | Bending strength(3PB B10; MPa) |
|---|---|---|---|
| 300 | 14 | 4200 | 300 |
| 400 | 15 | 6000 | 340 |
| 500 | 16 | 8000 | 370 |
| 600 | 17 | 10200 | 450 |
| 700 | 18 | 12600 | 470 |
| 800 | 20 | 16000 | 510 |
| 900 | 21 | 18900 | 580 |
| 1000 | 22 | 22000 | 720 |

METHOD OF INCREASING STRENGTH OF GLASS SUBSTRATE FOR OPTICAL FILTER AND TEMPERED-GLASS OPTICAL FILTER MADE THEREBY

BACKGROUND OF THE INVENTION

1. Field of the Invention

The present invention relates to a method of increasing the strength of a glass substrate for optical filters and a tempered-glass optical filter made thereby, in which a surface compressive stress value (CS) and a depth of layer (DOL) of the glass substrate are adjusted using a chemical-tempering process to increase the bending strength of the optical filter.

2. Description of the Related Art

An optical filter is a device for selectively transmitting a band in a specific wavelength or preventing the transmission thereof. An optically designed multilayered film is formed on a substrate to obtain the optical filter.

Such optical filters are used in various fields, and in particular, optical filters are widely used in order to control the wavelength of light received by an imaging lens of a camera.

In general, solid-state image-sensing devices such as CCD or CMOS, which convert light into electrical signals, are used in video cameras, digital cameras, or smartphone cameras. Since solid-state image-sensing devices receive not only a visible-ray region (400~700 nm) but also a near-infrared region (~1200 nm), the image that people actually perceive and the pictorial image have different colors.

In order to correct this, an optical filter such as a near-infrared-cut filter (IR-cut filter) for blocking wavelengths in the near-infrared region is used.

The near-infrared-cut filter is positioned between the imaging lens and the solid-state image-sensing device constituting an imaging device, and blocks the near-infrared region light among the light that is incident from the imaging lens so that the light is provided to the light-receiving portion of the solid-state image-sensing device.

As a conventional near-infrared-cut filter, a reflective-cut filter having a near-infrared reflective layer formed on an upper portion or a lower portion of a transparent glass substrate has been used. However, as high-pixel models are currently being developed, a hybrid filter in which absorption and reflection types are combined is widely used.

For example, there is a technique for forming a near-infrared reflective layer including an oxide multilayered film on a blue glass substrate that absorbs near-infrared rays.

In the case of such a glass substrate, there is a problem in that the glass substrate is broken by external impact or stress. In the case of a commercially available near-infrared-cut filter, the thickness of the glass substrate is large. When the thickness of the glass substrate is small, it is very difficult to handle and process the glass substrate.

Further, when a glass substrate (usually borosilicate glass is used) is used, during the deposition of a near-infrared absorbing layer or reflective layer, stress occurs due to the difference in thermal expansion coefficient between the deposition material and the substrate, which causes the substrate to warp. Accordingly, it is difficult to set deposition conditions due to the warpage.

Meanwhile, in the case of smartphones, which are more popular than video cameras or digital cameras, there is increased demand for differentiated designs along with the demands for high definition and high performance. Accordingly, a slimmer and lighter smartphone is in demand.

However, high-resolution cameras require a specification for realizing high resolution; for example, a lens system in which at least three imaging lenses are used must be adopted, and a near-infrared-cut filter and a solid-state image-sensing device must be used as basic constituents thereof. Accordingly, there is a limit in the extent to which it is possible to reduce the thickness of imaging devices, which limits the ability to realize slimmer smartphones.

In order to reduce the thickness of the imaging device, therefore, research into the shape of the lens constituting the lens system or the assembly method thereof is being conducted, and studies to minimize the thickness of the cover glass for protecting the lens system are also being conducted.

Further, research to reduce the thickness of the near-infrared-cut filter, which is of interest in the present invention, is also underway; in particular, the thinning of the glass substrate as described above has been proposed as one way to attempt the slimming thereof.

However, in the case of the glass substrate, when the thickness thereof is reduced as described above, the strength thereof is also greatly reduced, which has been pointed out as the biggest problem, and there is a further problem in that the processing and handling thereof are not easy.

Further, the near-infrared-reflective layer formed on the glass substrate is generally formed of a multilayered film including an oxide, in which case the stress difference between the glass substrate and the oxide decreases the strength of the glass substrate. In particular, in the case of a thin glass of 0.3 mm or less, since the strength thereof is low, more research is needed.

The present applicant is continuing to study optical filters using thin glass, and there is the technology of Korean Patent Application No. 10-2017-0125910 titled. "An optical filter and a method of manufacturing the same)", filed by the present applicant, as a method of manufacturing an optical filter using a thin glass substrate.

The above-described conventional technology includes forming a sheet-cutting part on a disc glass substrate in cell units, tempering the disc glass substrate so that the upper portion and the lower portion of the disc glass substrate are tempered and the side portion thereof is also tempered through the sheet-cutting part, forming an optical filter layer on each of the upper portion and the lower portion of the disc glass substrate, and dividing the disc glass substrate into cell units, thus forming a cell-unit optical filter.

Due to the structure of the optical filter, an optical filter layer must be essentially formed on a glass substrate. The optical filter layer is realized by a near-infrared-reflective layer and a visible-ray-low-reflective layer. As the optical filter layer, an oxide multilayered film, for example, $SiO_2$, $TiO_2$, $Ta_2O_5$, or $Nb_2O_5$, is used.

In a conventional process, owing to the necessity to increase the strength of the thin glass substrate according to the use thereof, the strength is reinforced by tempering the thin glass substrate. However, as described above, the multilayered optical filter layer decreases the strength of the glass substrate.

In other words, the compressive stress applied to the glass substrate is canceled by a tempering process, thereby causing a decrease in the reinforced strength of the glass substrate.

As such, the demand for thin glass substrates is gradually increasing according to the slimming of the product, and further studies on glass substrates for optical filters are required due to the need for high durability and stable use in the use environment.

SUMMARY OF THE INVENTION

Accordingly, the present invention has been made keeping in mind the above problems occurring in the related art, and an object of the present invention is to provide a method of increasing the strength of a glass substrate for optical filters and a tempered-glass optical filter made thereby, in which a surface compressive stress value (CS) and a depth of layer (DOL) of the glass substrate are adjusted using a chemical-tempering process to increase the bending strength of the optical filter.

In order to accomplish the above object, the present invention provides a method of increasing the strength of a glass substrate for optical filters and a tempered-glass optical filter using a tempered glass substrate manufactured using the same, in which the glass substrate for optical filters is subjected to chemical tempering so that a compressive stress (CS) and a depth of layer (DOL) of the glass substrate are adjusted to increase the bending strength thereof.

In the present invention, the compressive stress of the glass substrate subjected to chemical tempering is 300 MPa or more, and the depth of layer thereof is 10 µm or more. When the value of the product of the compressive stress (CS) and the depth of layer (DOL) is 5000 MPa·µm or more, the value of the bending strength (B10) is 300 MPa or more.

Further, an upper surface compressive stress and a lower surface compressive stress of the glass substrate may have different values.

Further, it is preferable that the depth of layer be in a region of 5 to 25% from a surface of the glass substrate.

Further, it is preferable that the chemical tempering be performed a plurality of times. The chemical tempering includes sequentially performing a first chemical-tempering process, a second chemical-tempering process, . . . , and an n-th chemical-tempering process wherein n is a natural number, so that a chemical-tempering temperature is lower and a chemical-tempering time is shorter in a subsequent chemical-tempering process than in a previous chemical-tempering process.

Meanwhile, it is preferable that the glass substrate have a thickness of 0.05 to 0.3 mm.

In the present invention, an optical filter is manufactured using a tempered glass substrate to thus provide an optical filter having increased strength.

Further, in the present invention, a surface compressive stress value (CS) and a depth of layer (DOL) of the glass substrate are adjusted using a chemical-tempering process to increase the bending strength of the optical filter, whereby the durability and strength of the optical filter in the use environment are increased.

BRIEF DESCRIPTION OF THE DRAWINGS

The above and other objects, features and advantages of the present invention will be more clearly understood from the following detailed description taken in conjunction with the accompanying drawings, in which:

FIG. 3 is a view showing data on the bending strength of an optical filter according to an embodiment of the present invention;

FIG. 4 is a view showing various data on bending strengths according to various embodiments of the present invention.

DESCRIPTION OF THE PREFERRED EMBODIMENTS

In the present invention, a glass substrate for optical filters is subjected to chemical tempering so that a surface compressive stress value (CS) and a depth of layer (DOL) of the glass substrate are adjusted to increase the bending strength of the optical filter, whereby the durability and strength of the optical filter in the use environment are increased.

Figure 1:
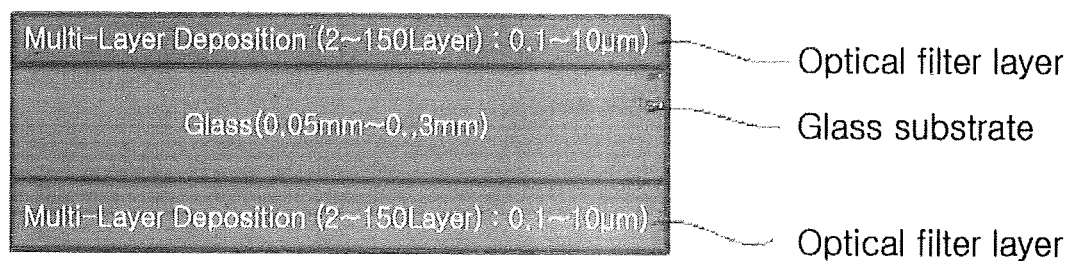
FIG. 1 is a mimetic diagram of an optical filter according to an embodiment of the present invention.
Figure 2:
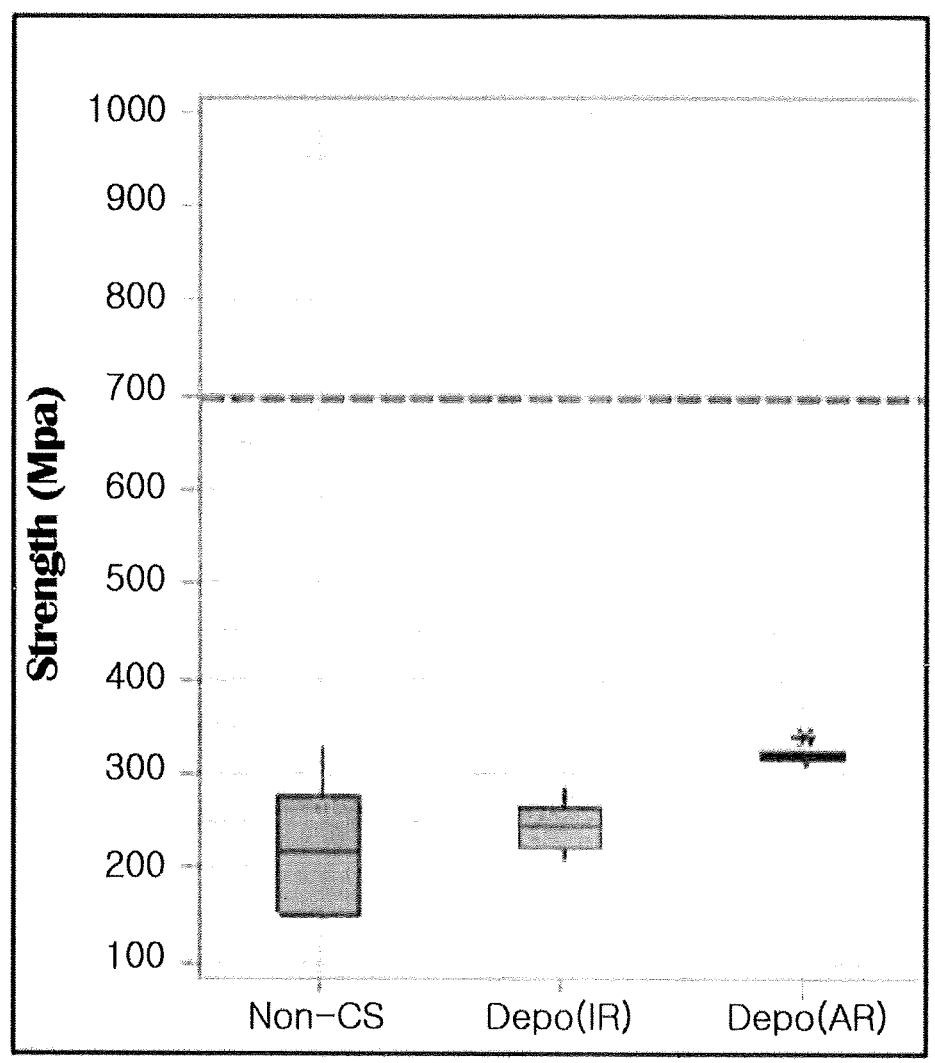
FIG. 2 is a view showing data on the bending strength of a conventional optical filter.
Figure 5:
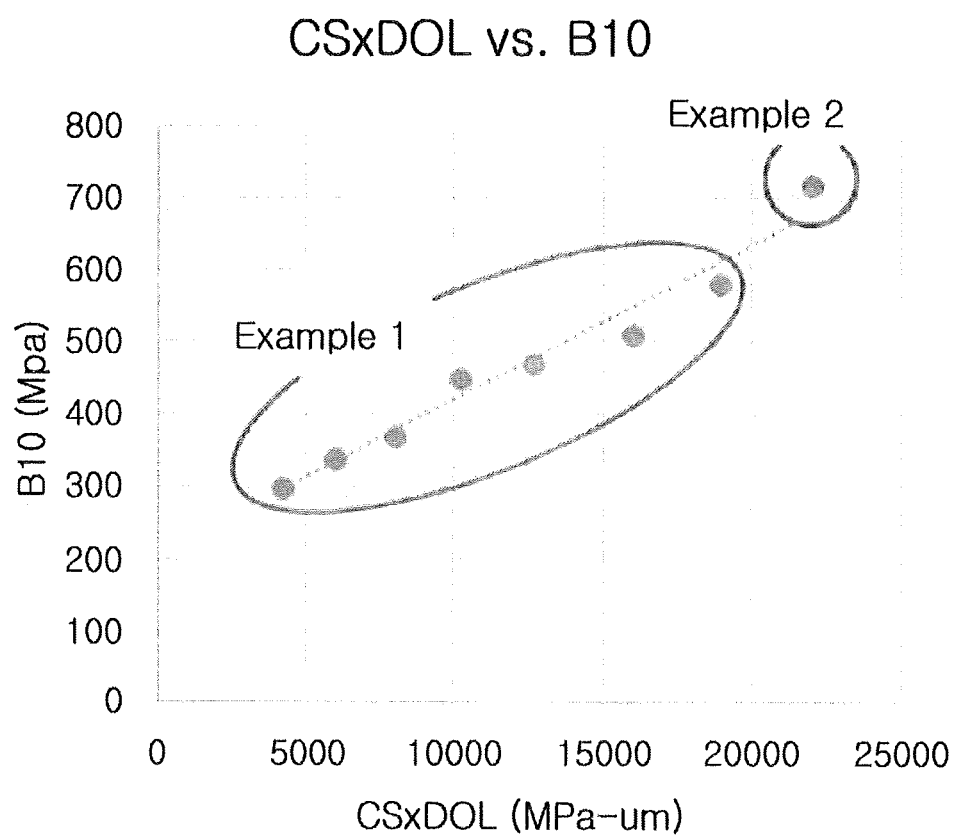
FIG. 5 is a view showing a correlation for a B10 value according to a product of a compressive stress and a depth of layer in various embodiments of the present invention.

Hereinafter, the present invention will be described in detail with reference to the accompanying drawings. FIG. 1 is a mimetic diagram of an optical filter according to an embodiment of the present invention, FIG. 2 is a view showing data on the bending strength of a conventional optical filter, FIG. 3 is a view showing data on the bending strength of an optical filter according to an embodiment of the present invention, FIG. 4 is a view showing various data on bending strengths according to various embodiments of the present invention, and FIG. 5 is a view showing a correlation for a B10 value according to a product of a compressive stress and a depth of layer in various embodiments of the present invention.

As shown in the drawings, a method of increasing the strength of a glass substrate for optical filters according to the present invention includes performing chemical tempering the glass substrate for optical filters so that a surface compressive stress value (CS) and a depth of layer (DOL) of the glass substrate are adjusted to increase the bending strength of the optical filter.

In the present invention, as the glass substrate, a mother or disc glass substrate or a cell-unit glass substrate is used in accordance with a process environment, and chemical tempering may be performed using the mother glass substrate for convenience of processing.

The chemical tempering in the present invention is generally a substitution-tempering process using ion exchange. The chemical tempering is performed at a temperature of 350 to 450° C. using potassium nitrate ($KNO_3$). After the tempering, slow cooling is performed to prevent cracking, and when the tempering is finished, the glass substrate is cleaned to be prepared.

In the chemical-tempering process, due to a difference in ionic radius between $Na^+$ ions contained in the glass and $K^+$ ions contained in an alkali-salt-molten solution, the $K^+$ ions having the larger ion radius in the alkali-salt-molten solution are exchanged with the $Na^+$ ions having the smaller ion radius on the glass surface, which applies compressive stress (CS) to the glass surface, and the corresponding force thereof causes tensile stress therein.

When the chemical-tempering process is performed as described above, significant physical variables include the compressive stress applied to the glass surface, tensile stress which corresponds to the compressive stress and occurs in the glass, and a depth of layer (DOL), which is a depth of penetration of the ions from the glass surface.

The present invention is provided to increase the compressive stress acting on the glass surface and also increase the depth of layer (DOL), thereby ultimately increasing the strength of the glass substrate. As a result, the bending strength of the optical filter manufactured using the glass substrate having the increased strength is increased.

As shown in FIG. 1, in the optical filter in which the multilayered optical filter layer is formed on the upper portion and the lower portion of the glass substrate, the bending strength thereof is a very important factor.

Stress occurs due to a difference in thermal expansion coefficient between the optical filter layer and the glass substrate, thus breaking the compressive stress balance of the glass substrate by an external impact, which causes a reduction in the strength or warpage of the glass substrate. In particular, the thin glass of 0.3 mm or less is very vulnerable in this aspect.

Therefore, in the present invention, in order to increase the bending strength of the optical filter having the optical filter layer including the multilayered film, chemical tempering is performed so that the compressive stress and the depth of layer are optimally adjusted depending on the type of glass substrate. In other words, the compressive stress and the depth of layer are used as variables to increase the bending strength.

However, the compressive stress and the depth of layer are generally known to be inversely related with each other according to chemical-tempering process conditions. Accordingly, it is difficult to increase these values simultaneously.

In other words, it is known that the depth of layer is increased when the temperature of the molten salt is high or when the tempering time is long and, on the other hand., that the compressive stress has a higher value when the temperature of the molten salt is low or when the tempering time is short.

Therefore, it is very difficult to simultaneously adjust the depth of layer and the compressive stress. In particular, no attempt has been made to increase the bending strength by adjusting the depth of layer and the compressive stress value of an ultra-thin glass substrate of 0.3 mm or less, or 0.05 to 0.3 mm, for the purpose of application to optical filters.

According to the present invention, the glass substrate is subjected to chemical tempering in order to increase the bending strength thereof by adjusting the compressive stress and the depth of layer of the glass substrate for optical filters. The glass substrate subjected to chemical tempering according to the present invention has a compressive stress of 300 MPa or more and a depth of layer of 10 μm or more.

In this case, when the value of the product of the surface compressive stress (CS) and the depth of layer (DOL) of the glass substrate is 5000 MPa·μm or more, a value of the bending strength (B10) is 300 MPa or more. The value of the bending strength in the present invention is a value obtained from a 3-point-bending (3PB) property, and is based on the value of the bending strength (B10) at the lower 10%.

In other words, the experimental results show that the value of the B10 bending strength of the optical filter satisfies the minimum condition when the compressive stress and the depth of layer are simultaneously adjusted so that the value of the product of the compressive stress and the depth of layer exceeds a predetermined value. Therefore, it is possible to increase the bending strength of the optical filter by adjusting the compressive stress and the depth of layer of the glass substrate.

In the present invention, when the value of the product of the surface compressive stress (CS) and the depth of layer (DOL) of the glass substrate is 5000 MPa·μm or more, the value of the bending strength (B10) is 300 MPa or more.

Accordingly, in order to obtain bending strength of 300 MPa or more (the minimum value of the bending strength that is required when the thin glass substrate is used in an optical filter), a chemical-tempering process must be performed so as to find the optimal combination of compressive stress and depth of layer.

Further, the depth of layer in the present invention is set to be in a region of 5 to 25% from the surface of the glass substrate so as to be balanced with the internal tensile stress.

Meanwhile, the upper surface compressive stress and the lower surface compressive stress of the glass substrate may be different from each other. In the case of the glass substrate for optical filters, optical filter layers having different thicknesses may be formed on the upper portion and the lower portion of the glass substrate. In this case, the compressive stresses at interfaces with which the optical filter layers are in contact have different values depending on the thickness of the optical filter layer.

Specifically, the surface compressive stress of the tempered glass substrate is relatively larger in a thicker side of the optical filter layer than in a thinner side of the optical filter layer.

In other words, the stress applied to the glass substrate depends on the thickness of the optical filter layer, and the surface compressive stress of the side of the glass substrate that is in contact with the thicker side of the optical filter layer is further lowered. In order to overcome this, accordingly, higher compressive stress is applied to the surface of the glass substrate on which the thicker side of the optical filter layer is formed.

In the present invention, the optical filter layer is obtained by depositing two to five kinds of materials having different refractive indices in multiple layers, and an oxide multilayered film, for example, $SiO_2$, $TiO_2$, $Ta_2O_5$, or $Nb_2O_5$ is used.

Further, in the optical filter layer, any one of a near-infrared-reflective layer and a visible-ray-low-reflective layer is formed on each of the upper portion and the lower portion of the glass substrate, or a combination of the near-infrared-reflective layer and the visible-ray-low-reflective layer is formed on each of the upper portion and the lower portion of the tempered glass substrate.

The optical filter layer is for selectively reflecting or transmitting a band of a specific wavelength, and a near-infrared-reflective layer or a visible-ray-low-reflective layer may be embodied as an embodiment of the present invention, thus being used in a near-infrared cut filter.

The optical filter layer is mainly formed by depositing an oxide multilayered film. The optical filter layer is formed by selectively depositing an oxide multilayered film having a predetermined thickness and high and low refractive indices in order to minimize the dependence on an incidence angle according to the optical design according to the purpose or use thereof and in order to transmit or reflect the wavelength for a specific region.

In other words, according to the optical design according to the purpose or use thereof, any one of the near-infrared-reflective layer and the visible-ray-low-reflective layer may be formed on each of the upper portion and the lower portion of the glass substrate, or a combination of the near-infrared-reflective layer and the visible-ray-low-reflective layer may be formed on each of the upper portion and the lower portion of the glass substrate.

For example, any one of the near-infrared-reflective layer of the multilayered film and the visible-ray-low-reflective layer of the multilayered film may be formed on each of the upper portion and the lower portion of the tempered glass substrate, the near-infrared-reflective layer of the multilayered film may be formed on the upper portion and the visible-ray-low-reflective layer of the multilayered film may be formed on the lower portion or vice versa thereof, or the combination of the near-infrared-reflective layer of the multilayered film and the visible-ray-low-reflective layer of the multilayered film may be formed on each of the upper portion and the lower portion thereof.

Such an optical filter layer is obtained using a known physical or chemical vapor deposition method, for example, may be formed using an E-beam, sputtering, or CVD process.

Further, a near-infrared absorption layer may be further formed on the lower portion of the optical filter layer on the upper portion or the lower portion of the tempered glass. The near-infrared absorption layer may be formed by including a near-infrared absorbing component in a resin.

In the present invention, in order to form the tempered-glass optical filter, chemical tempering is performed to adjust the compressive stress and the depth of layer. The chemical tempering may be performed once or a plurality of times depending on the composition of the glass substrate, the customer requirements, and product specifications.

In particular, when the chemical tempering is performed a plurality of times, a first chemical-tempering process, a second chemical-tempering process, . . . , and an n-th chemical-tempering process wherein n is a natural number, are sequentially performed so that a chemical-tempering temperature is lower and a chemical-tempering time is shorter in a subsequent chemical-tempering process than in a previous chemical-tempering process.

In other words, when a satisfactory compressive stress and depth of layer of the glass substrate are not obtained during the first chemical-tempering process, several chemical-tempering processes may be performed. In particular, since the chemical-tempering temperature is lower and the chemical-tempering time is shorter in a subsequent chemical-tempering process than in a previous chemical-tempering process, a sufficiently large depth of layer is ensured due to the high chemical-tempering temperature and the long chemical-tempering time during the previous chemical-tempering process, and the sufficiently high compressive stress is ensured due to the lower chemical-tempering temperature and the shorter chemical-tempering time during the subsequent chemical-tempering process.

The chemical treatment process may be repeated a plurality of times until the desired depth of layer and compressive stress values are obtained.

In general, the chemical tempering in the present invention is a substitution-tempering process using ion exchange. The chemical tempering is performed at a temperature of 350 to 450° C. using potassium nitrate ($KNO_3$). In the final chemical-tempering process, preferably, a chemical-tempering temperature is 380 to 400° C. and a chemical-tempering time is 10 minutes or less.

In particular, the depth of layer and the compressive stress may be adjusted a plurality of times so as to change stepwise according to respective chemical treatment processes.

As such, in the present invention, it is confirmed that the minimum bending strength that the consumer requires is obtained when the compressive stress and the depth of layer of an ultra-thin glass having a thickness of 0.05 to 0.3 mm are adjusted using the chemical-tempering process so that a value of a product of the compressive stress and the depth of layer is a certain value or more.

FIG. 2 shows the data on the bending strength of a conventional optical filter. A glass substrate having a thickness of 0.2 mm was used, and FIG. 2 shows the measurement value of the bending strength B10 when no chemical-tempering process is performed. In the cases when the bottom side is glass (Non-CS), a near-infrared-optical-filter layer (Depo.(IR)), and an antireflective layer (Depo.(AR)), 3PB B10 values were measured. The respective values were 135 MPa, 208 MPa, and 305 MPa. It was observed that the strength was reduced when tensile strength was applied to the thicker side of the deposition layer (IR bottom).

FIG. 3 shows the bending strength (3PB B10) measured when the compressive stress and the depth of layer according to Examples 1 and 2 of the present invention are adjusted. In Examples 1 and 2, the glass substrates produced by different commercial manufacturers were used, and two chemical-tempering processes were performed. The chemical-tempering temperature was lower and the chemical-tempering time was shorter in the second chemical-tempering process than in the first chemical-tempering process. During the first chemical-tempering process, the chemical tempering was performed at 400° C. for 60 minutes in Example 1, and the chemical tempering was performed at 440° C. for about 60 minutes in Example 2. During the second chemical-tempering process, the chemical tempering was performed at a temperature of 380° C. within 10 minutes in Examples 1 and 2.

In both Examples 1 and 2, an optical filter layer and an antireflective layer were formed as a deposition coating layer, and the thicker side of the optical filter layer was set as a bottom side to measure a 3PB B10 property.

In the case of Example 1, the compressive stress value and the depth of layer were measured to be 800 MPa and 20 μm, respectively. In the case of Example 2, the compressive stress value and the depth of layer were measured to be 1000 MPa and 22 μm, respectively. The respective B10 values were 510 MPa and 720 MPa.

This resulted in a higher bending strength value than in the case of using a conventional glass substrate (FIG. 2) even though the ultra-thin glass of 0.3T or less was used as a substrate and a multilayered optical filter layer and an antireflective layer were formed.

FIG. 4 shows data of the compressive stress and the depth of layer according to various chemical tempering conditions in Examples 1 and 2. FIG. 5 shows a correlation for a B10 value according to the product of the compressive stress and the depth of layer in various embodiments of the present invention.

As shown in FIG. 4, in both cases of Examples 1 and 2, the B10 values were 300 MPa or more, indicating that there is no problem with regard to commercialization. In particular, in the case of Example 2, when the compressive stress (CS) was 1000 MPa and the depth of layer (DOL) was 22 μm, the product thereof (CS×DOL) was 22,000 MPa·μm, in which case the B10 value was 720 MPa, indicating a very high bending strength.

As shown in FIG. 5, it could be confirmed that, in the cases of Examples 1 and 2, the B10 value and the product of the compressive stress and the depth of layer satisfied a proportional relationship. Therefore, it is possible to increase the B10 value by adjusting the compressive stress and the depth of layer.

In other words, according to the embodiment of the present invention, it could be confirmed that, in the case of the ultra-thin glass substrate having a thickness of 0.3 mm or less, when the product of the compressive stress (CS) and the depth of layer (compressive area (DOL)) was more than 20,000 MPa·μm, the bending strength B10 (MPa) was more than 700 MPa.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of forming optical filters on a glass substrate wherein a strength of the glass substrate is increased, the method comprising:

performing chemical tempering on the glass substrate to form a tempered glass substrate having a bending strength B10 of 300 MPa or more, and having a higher surface compressive stress of one of an upper portion of the tempered glass substrate and a lower portion of the tempered glass substrate when compared to a surface compressive stress of the other of the upper portion of the tempered class substrate and lower portion of the tempered glass substrate, forming optical filter layers on the upper portion of the tempered glass substrate and the lower portion of the tempered glass substrate, the optical filter layers formed on the upper portion of the tempered glass substrate and the lower portion of the tempered glass are different from each other in thickness, wherein the thicker optical filter layer is formed on the portion having the higher surface compressive stress, and the thinner optical filter layer is formed on the portion having the lower surface compressive stress to give a product wherein a surface compressive stress of the tempered glass is relatively larger on the side where the optical filter layer is thicker than the side where the optical filter layer is thinner, and wherein the optical filter layers formed on each of the upper portion of the tempered glass substrate and the lower portion of the tempered glass substrate are independently selected from the group consisting of: a) near-infrared-reflective layers; b) visible-ray-low-reflective layers; and c) a combination of the near-infrared-reflective layer and the visible-ray-low-reflective layer.

2. The method of claim 1, wherein a depth of layer is 10 μm or more.

3. The method of claim 1, wherein a value of a product of the surface compressive stress and a depth of layer is 5000 MPa•μm or more.

4. The method of claim 1, wherein a depth of layer is in a region of 5% to 25% from a surface of the glass substrate.

5. The method of claim 1, wherein the chemical tempering is performed a plurality of times.

6. The method of claim 5, wherein the chemical tempering includes sequentially performing a first chemical-tempering process, a second chemical-tempering process, . . . , and an n-th chemical-tempering process wherein n is a natural number, so that a chemical-tempering temperature is lower and a chemical-tempering time is shorter in a subsequent chemical-tempering process than in a previous chemical-tempering process.

7. The method of claim 1, wherein the glass substrate has a thickness of 0.05 to 0.3 mm.

* * * * *